July 24, 1956
L. SMIDTH
2,755,509
PROCESS FOR PRODUCING DENSIFIED GRANULAR
THERMOSETTING MOLDING COMPOSITIONS
Filed July 13, 1950
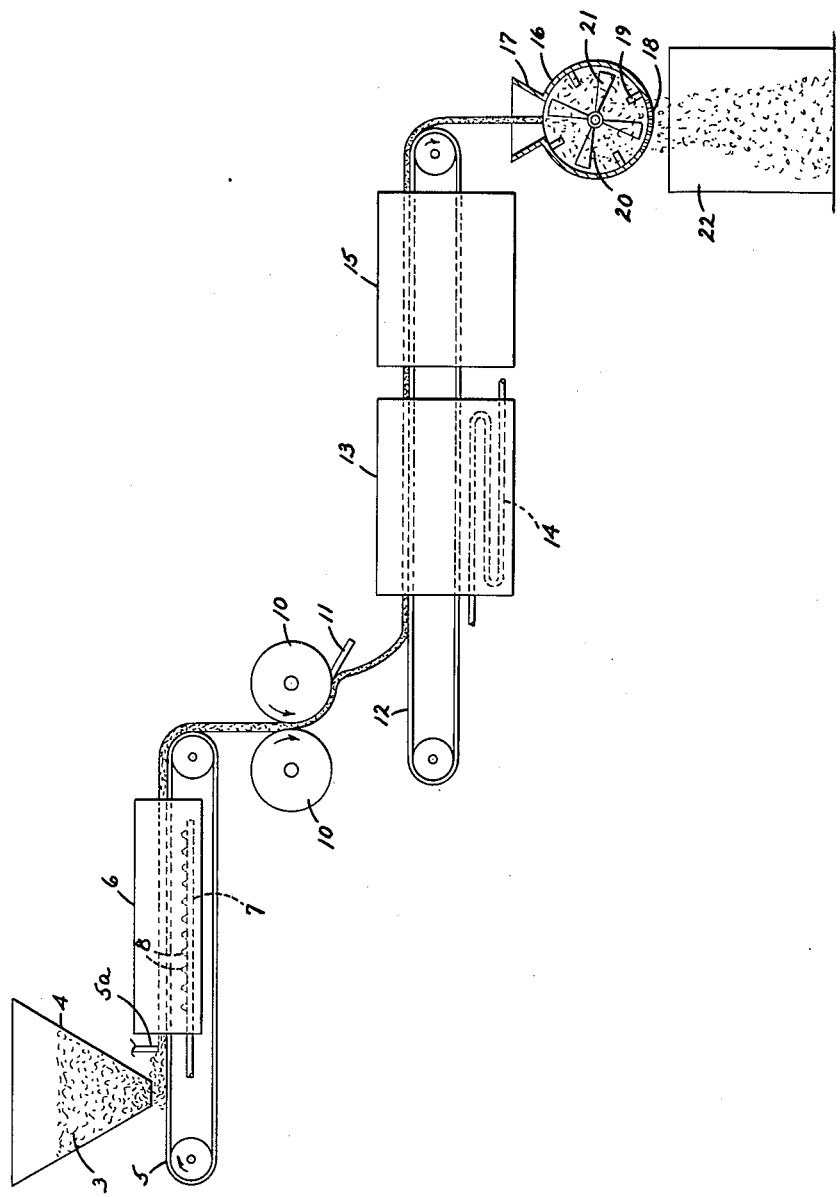
INVENTOR.
LEONARD SMIDTH
BY
Thomas R O'Malley
ATTORNEY.

United States Patent Office 2,755,509
Patented July 24, 1956

2,755,509

PROCESS FOR PRODUCING DENSIFIED GRANULAR THERMOSETTING MOLDING COMPOSITIONS

Leonard Smidth, New York, N. Y., assignor to American Viscose Corporation, Wilmington, Del., a corporation of Delaware Application July 13, 1950, Serial No. 173,573

4 Claims. (Cl. 18—47.5)

The present invention relates to a process for the manufacture of granulated aminoplast thermosetting resin compositions; in particular, to an improved, continuous process for making granulated urea-formaldehyde molding compositions. The invention also relates to correlated improvements designed to improve the methods of making such granulated products and to enhance the properties of such compositions and the molded articles produced therefrom.

Water-soluble aminoplast molding compositions, such as those of urea-formaldehyde, melamine-formaldehyde and the like, are generally prepared in two forms, namely a fine powder and a densified granular material. The powder is used in operations where a fine surface is essential or where the "grainy" effect of the densified granular material is objectionable. The powder is also somewhat lower in cost as it does not have to be further processed by granulation. For many molding operations where preforms are necessary, powder is objectionable because it is difficult to tablet. The powder "bridges over" and does not properly flow in the hopper of a preforming machine. The powder contains much entrapped air and varies in its specific gravity which adds to the difficulty of preforming. It lodges or is blown between the surfaces of the die, increasing the friction and load on the preforming machine generally causing it to "labor."

In closing a mold during the molding process, the light low density powder tends to blow out of the mold unless it is closed slowly. Frequently, entrapped air will cause blistering or a haze that is easily seen in the molded translucent composition.

Commercial granular material as now produced has certain marked limitations. During the densifying, there is a tendency for portions of the material to become denser than others or to be overheated. This causes the material to become stiffer in flow, i. e. partially "precured." The resultant granular material after cutting then comprises particles of different densities and flow and in the translucent molded product this shows up as a mottled effect which, of course, is undesirable. Control of the densifying operation to minimize or eliminate this condition is difficult.

Standard commercial practice of preparing granular material in a Banbury requires that the material be made in batch operations, in contrast to a "continuous" process, and although the time-cycle is rather short, the capacity of the Banbury mixer is limited. Hence, the amount of granulated material that can be produced per unit batch is likewise limited and, moreover, successive batches are often non-uniform.

When rolls are used in place of Banburys, there is a tendency for the sheeted mass to be much more dense in the center where the powder is fed and less toward the edges. Sometimes, because of lack of plasticity, the powder will not adhere to the rolls except at the center and more pressure has to be applied by closing the gap between the two rolls. At other times, the sheeted material is difficult to remove from and will adhere to the rolls, making a second revolution and picking up additional powder, and, because of the low plasticity and high pressures used, forming a material of very high density. Granular material prepared from sheets having such varying density would give molded products with mottled effects.

Most of the difficulties encountered with densifying urea-formaldehyde molding powder or other aminoplast compositions stem from the lack of plasticity of such compositions. They require much higher pressures than other thermosetting resins, such as those of phenol-formaldehyde, to work or colloid them.

It is a general object of the present invention to provide a process for overcoming the difficulties heretofore encountered in the densification of powdered aminoplast molding compositions.

It is a specific object of the present invention to provide a continuous process for the densification of powdered aminoplast molding compositions.

It is another object of the present invention to provide granulated aminoplast compositions which have particles of uniform density and contain a minimum amount of fines.

Another object of the invention is to provide a continuous method for making improved granular urea-formaldehyde compositions suitable for molding.

Another object is to provide a method for granulating urea-formaldehyde molding compositions requiring considerably less power for densifying and resulting in less wear and tear on the machines.

A further object of the invention is to provide a method of producing granulated urea-formaldehyde molding compositions which upon being molded produce uniform products having improved physical properties and surface characteristics.

It has been found that a densified urea-formaldehyde molding composition substantially free of the mottling effect can be prepared in a continuous manner by plasticizing a dried powdered composition with water prior to densification and removing such water after densification.

It has already been proposed in the prior art to improve the plasticity of urea-formaldehyde molding compositions by the addition of moisture which was allowed to remain in the composition during molding. It has now been found that such added moisture is deleterious to the composition and the molded product. The presence of moisture decreases the "shelf life," that is the flow of the composition is gradually reduced by the moisture during storage. The moisture also causes the formation of gas and is likely to form blisters and opaque sections in the molded product.

In the present invention, however, the moisture is removed from the composition after densification and before storage so that it does not affect the composition deleteriously. By introducing water before densification, the flowing qualities of the material are increased and the resultant material can be densified with much less pressure than heretofore has been necessary for this purpose to obtain a comparable densification.

In order to color a dried urea-formaldehyde composition and give it uniformity in lot after lot, it is necessary to grind it to a fine powder and then mix it with coloring materials. This is accomplished by drying the composition to a flow at which there is little adhesion of the particles. At this stage of dryness, there is a suitable flow in the hot mold but it does not have sufficient plasticity for easy working and densification thereafter. If conventional or permanent plasticizers are added to allow easy working, then the composition will be too soft in flow during molding, and the molded products have defects due to too much plasticizer, such as bleeding, etc.

In the present invention, the composition is dried to provide proper flow for the hot molding, the composition is then ground to a powder, molding adjuvants, such as dyes, pigments, lubricants, latent catalysts, and the like, are mixed with the powder to provide a uniformly blended composition, then water is introduced for facilitating the immediately following densification, and after the densifying operation, the water is removed, either before during or after comminution of the densified material.

In a preferred procedure, the powdered urea-formaldehyde molding composition is steamed to moisten and heat it at the same time; then it is compressed and formed into a sheet on mixing rolls, the sheet is dried; and then it is comminuted into the final granular molding composition. This process may be carried out without heating the moistened powder but it is preferable to do so since the heat adds to the plasticity of the powder and requires less moisture to be gotten rid of after the compression. This process can also be used in connection with Banbury mixers which produces a lumpy mass instead of a continuous sheet.

In general, the granular molding compositions are obtained by introducing a controlled amount of moisture into the water-soluble molding composition in the condition of a powder in as uniform a manner as possible. One method is to moisten and agitate at the same time causing the particles of powder to agglomerate into beads or granules of various sizes, and after agitation, the mass is compacted, preferably between rolls, and dried to render the granular composition stable in preparation for packaging either for storage or shipment. Another method is to moisten the powder without agitation, compacting and drying, then comminuting to a granular state. Comminution may be effected either before or after drying. A convenient method is to dry the densified mass while it is in the sheeted form. The densified material with the added moisture is considerably more plastic and, therefore, more likely to "gum up" cutters used for comminution. Therefore, cutting is usually best performed after at least a partial drying to avoid such "gumming." The various steps of introducing moisture, densifying and drying involved in the granulating procedure are generally carried out under conditions which avoid any appreciable advance of the flow of the resin composition so that the granular molding composition has substantially the same flow characteristics as that of the powdered composition from which it is made. However, if it is desirable to stiffen the flow of the material, the heat treatment can be regulated to give the desired flow. On the other hand, if the flow is to be softened, a dry composition or resin having a softer flow can be admixed with the powder prior to or during granulation, or a liquid condensate or precondensate may be used in addition to the water used in granulating.

The water-soluble powdered aminoplast molded compositions which may be used in forming the granular molding compositions of the present invention comprise those of the following types and species: amino-aldehyde such as urea-aldehyde, thiourea-urea-aldehyde, melamine-formaldehyde, dicyandiamide-aldehyde, melamine-modified dicyandiamide-formaldehyde, melamine-urea formaldehyde, urea-aldehyde-ether, melamine-aldehyde-ether, and the like, as well as various mixtures obtainable by mixing the separate resin precondensates, or by mixing therewith other aldehyde-reactive materials before or during condensation with an aldehyde.

Such molding compositions may be prepared by reacting the formaldehyde with the other component or components, such as urea, in aqueous medium to form a liquid solution of the water-soluble precondensate. A filler, such as of alpha cellulose fiber, is combined with the liquid before, during or after condensation but prior to drying and the mass comprising the filler soaked with the liquid condensation product solution is then dried. After drying, the mass is ground in a pebble mill or equivalent apparatus to the consistency of a fine fluffy powder. Up to this stage in the process, any conventional or known procedure may be used and various material, such as dyes, pigments, mold lubricants, and accelerating agents, especially latent curing catalysts, may be incorporated into the powder at any of the several stages, especially during the grinding stage during which the material is reduced to powder form. Commercial molding powders are usually sold with a free-moisture content of from 1 to 2% and sometimes up to 3%.

Since the original resin composition contains a large amount of water from the aqueous 40% formalin used, it might be thought that this could be used as a basis for the preparation of granular material without first drying and pulverizing. But the preparation of a homogeneous molding composition capable of being colored to any shade and accurately matched is almost impossible without reducing the material to a fine powder. Reducing the composition to a powder is almost impossible unless it is relatively dry.

Present day molding compositions are characterized by their good flow and rapid cure. Because of their nature such materials are extremely sensitive to heat and moisture and particularly to the combination of the two. Some latent catalysts decompose in the presence of moisture so that in such cases a minimum amount of moisture should be used. Anyhow, it is good procedure to use the smallest amount of moisture necessary to provide the proper softening for the sheeting or other densifying operation.

The powdered water-soluble aminoplast may be treated so as to distribute the moisture substantially uniformly throughout its mass in various ways. For example, a simple batch procedure may involve the introduction of the powdered composition into a vessel in which it may be agitated, such as in a ribbon blender or in any equivalent device in which the powder is agitated. Water may be introduced just before the start of agitation or during the agitation. The water may be hot or cold or, instead of water itself, a steam jet or a plurality thereof may directly feed steam into the mass undergoing agitation. A continuous procedure may be employed, such as by supplying the molding composition continuously to one end of an endless belt or apron which continuously passes the material through a chamber provided with an atmosphere of high humidity, such as may be obtained by introducing high humidity air, steam, or sprays or vapors of water. When steam is used, either dry or wet steam is continuously introduced into the chamber and when humidified air is used, it is continuously passed through the chamber and reconditioned before reintroduction. After leaving the steam or humidifying chamber, the moist powder may be passed through an agitating zone, although this step is not necessary, such as through an inclined rotating drum provided with a helical agitating blade or into an inclined stationary drum which may be provided with a similar rotating blade for the purpose of balling the powder up into granules as it proceeds downwardly through the inclined devices. It has been found that the agitation may be extremely short in duration, preferably being only that necessary to assure that all individual particles of powder have an opportunity of being moved into contact with adjacent particles or agglomerates. The agitation thus may vary from a period of a few seconds to several minutes but no harm is done by prolonged agitation. Throughout the moisture distribution and agitation, the development of high temperatures in the mass is to be avoided. When steam is employed, temperatures may be permitted to rise as high as 50° C. In the mass for a short time. Somewhat higher temperatures, say up to 65° C. may be used, provided the duration of the treatment of the powder at such temperatures does not exceed a few minutes. Generally, adequate moisture can be introduced into the mass for the purpose of the present invention even by the use of wet or saturated steam without raising the temperature of the powder above 35 or 40° C. under normal conditions of operation and it is preferred to avoid temperatures above 40° C.

The amount of moisture added may vary but there should not be so much that the material will strongly adhere to the rolls or to the other compacting or densifying apparatus that may be used. Lubricants such as zinc stearate may be used to a certain extent to reduce this sticking. The amount of moisture should never be so much that the composition will not form a continuous self-sustaining sheet. The proportion to be added to any given molding composition will depend upon the initial moisture content thereof, as well as the extent of condensation. In general, however, the upper limit of moisture is that which is just sufficient to render the mass readily workable without becoming to flabby or pasty. Excess moisture requires a longer time for the drying out and removal.

It is difficult to state the permissible proportions of moisture in terms of percentages since the capacity of molding powders to tolerate the moisture and form a mass of optimum plasticity when subjected to the procedure of the invention varies widely depending upon the particular constitution of the molding powder. This is because of the fact that various molding compositions may have various types of fillers which exert varying affinities for the water used. In general, fresh urea-formaldehyde molding powders of the type now commercially available will require from 5 to 25% by weight of water when this percentage includes any residual moisture that may be in the powder at the time the water is added. The percentage just stated is based on the weight of the dry molding powder. As low as 1% moisture is effective if steam or heat is used. The greater the temperature of the powdered moist material, the less pressure will be required to convert the powder into a dense stock. Steam is ideal for this purpose since it furnishes both moisture and heat. In some cases the introduction of as llittle as one or two percent moisture in the form of steam is sufficient to agglomerate and effectively plasticize the powder for easy densification. The powdered material should not be brought up to the temperature of the steam but it should be treated with the steam whereby it can absorb the condensation as well as the heat but the temperature of the mass should not be substantially above 50° C. except for short durations. The invention is applicable as well to molding powders which are no longer fresh but have become somewhat "stiffened," that is, partially cured, but are still water-soluble. Such powders require proportionately more moisture to plasticize densification than the fresh powders depending upon the extent of advance of the cure or stiffening. However, the test for the proper range of moisture content is the ability to make a well-formed self-sustaining sheet which readily peels off the surfaces of the rolls or other densifying equipment.

The powder may be agglomerated with moisture and densified without agitation. For example, the material may be steamed or humidified while spread out and passed through rolls, no agitation being used. Then it may be cut or granulated after drying.

The densified mass is dried under conditions which do not appreciably advance the cure of the resin. Drying can be performed in any suitable fashion. Batchwise, the moist sheeted or comminuted densified material may be spread out in trays and dried at a temperature of 50° C. or less either at atmospheric or under vacuum drying conditions. It is best to dry the smallest granular particles possible because they dry rapidly without a case hardening or skin drying effect. Material of large cross section must be dried at a lower temperature and, consequently, for a much longer time in order to avoid precuring. In a continuous system, granules or a thin sheet may be fed to an endless travelling belt which conveys the material through a drying oven in which temperatures of as high as 65° C. may be maintained at a correspondingly short time. Drying should be as rapid as possible at the temperature employed for the higher the temperature the shorter must be the drying time, otherwise precuring is likely to occur. The drying need not proceed to absolute dryness though it is preferred to dry to a free moisture content of 0 to 2%.

Granular material usually produced by the present processs has a density in the range of approximately 0.59 to 0.65 which is just about double that of the powder from which it was produced. However, the density can be varied from these limits by increasing or lowering the pressure used during densification with or without an adjustment of the amount of added moisture.

The process may be utilized to incorporate various agents and substances into the composition. Dyes, coloring matter, plasticizers, softening agents, fillers, lubricants, catalysts, such as latent catalysts, and other modifying agents may be mixed with the powder prior to or during the granulating process.

In a preferred modification, the molding composition is spread on an apron and fed through a steaming zone, whereby the powder is moistened, heated and agglomerated. Then the material in the form of a low density agglomerate is fed through unheated rolls, whereby the material is compressed to a sheet of uniform density throughout its cross section.

The single figure of the drawing illustrates a preferred embodiment in which a continuous procedure for forming the granular composition is employed. As shown, a powdered thermosetting molding composition 3 is fed from a suitable supply thereof, such as from the hopper 4 onto a travelling belt 5 over which the mass is distributed by a comb or scraper 5a and which carries the material through a housing 6 which is provided with humidifying means, such as the pipe 7 provided with a plurality of nozzles 8, to liberate steam, sprays of water, or humidified air into the chamber. The time of passage through the chamber can readily be adjusted in correlation to the humidity in the chamber to provide the proper moisture content in the material discharged from the belt. The mat of moistened composition is discharged from the belt 5 into the nip between a pair of rolls 10 which are positively driven. One of the rolls may be driven faster than the other and a scraper 11 is provided to remove the sheeted mass from one of the rolls. The mass removed falls upon a travelling belt 12. The belt 12 carries the mass through a drying chamber or housing 13 which may be heated by any suitable means, such as a plurality of steam coils 14. From the drying chamber, the dried granules may be passed through a cooling device, such as through the chamber 15. Cold dry air is preferable since the material is hygroscopic. The cooled mass is discharged from belt 12 into a suitable cutter, such as that shown comprising a cylindrical shell 16 having a hopper feed opening 17 at the top and a screen discharge opening 18 at the bottom. The inside wall of the vessel 16 is provided with a plurality of rows of inwardly projecting stationary blades 19 and a rotating agitator 20 has blades 21 which pass between the adjacent blades 19 and serve to break up or comminute the composition introduced. The broken or comminuted mass passes through the screen 18 into a suitable receptacle 22.

The following examples, in which the parts mentioned are by weight unless otherwise noted, are illustrative of the invention.

*Example 1*

A urea-formaldehyde condensate containing a cellulose filler was prepared in accordance with U. S. Patent 2,338,464, dried, and then ground in a ball mill or other grinding apparatus until it was reduced to a fine fluffy powder.

Two hundred parts of this powder was placed in the bowl of a motor-driven mixer together with 25 parts of water. The stirrer was then started and run for several minutes. The mass was fed into a set of differential rolls, the temperature on the fast roll being adjusted to about 200–230° F. while the temperature on the slower roll was about 200° F. and the rolls being maintained at ⅛ inch apart. The composition without the added water caused the rolls to labor badly but with it they ran smoothly evidencing the effective plasticizing action of the water. The material formed a self-sustaining sheet and was scraped off after one-half revolution. The sheeted material was then dried in an oven maintained at 40° C. until the added moisture was driven off. After cooling in a dry atmosphere, it was cut into particles which would pass through a 10 mesh screen. It had a density of 0.624.

*Example II*

A urea-formaldehyde molding powder was prepared as in Example I. After the grinding in the ball mill was completed, 5% water was added and the milling continued for a short time. The powder was then sifted and densified in a Banbury mixer at 190° F. The added moisture reduced the power load on the machine considerably and the material produced was more homogeneous. The large lumps produced by the Banbury were broken up and the particles dried at 40° C. After cooling with dry air, the mass was cut so that it would go through a 10 mesh screen.

*Example III*

A urea-formaldehyde molding powder was prepared as in Example I. It was spread on a travelling apron (see the drawing) and passed over a box containing a steam outlet. This caused the powder to agglomerate into a light sheet which was fed into a pair of unheated differential rolls. There resulted a dense self-sustaining homogeneous sheet which was fed into an apron drier maintained at 50° C. After passing through the heated zone of the drier, the sheeted material passed through a cooling zone and afterwards into a cutter whereby it was reduced to a granular material passing a 10 mesh screen.

*Example IV*

A urea-formaldehyde molding powder several years old, having very little plasticity and incapable of being molded was stirred with 25% of a 1.5:1 molar mixture of formalin solution (40% concentration by volume in water) and urea. The moist mass was sheeted on rolls as in Example I, dried and the resultant sheets granulated. The granular material could then be molded at relatively low pressure.

*Example V*

A melamine molding powder was steamed and sheeted and treated as in Example III.

*Example VI*

A medium-flow urea-formaldehyde molding powder when made into "pills" one inch in diameter on a standard preforming machine resulted in preforms which could readily be broken with the fingers. The powder from the same batch was thoroughly stirred with 15% water and pills again prepared. The power required on the preforming machine was reduced considerably as evidenced by the small amount of "laboring" as compared to when the pills without the added moisture were preformed. The resulting pills were dried in an oven at 38° C. to a moisture content of 2%, then cut into granules passing a 10 mesh screen. It had a minimum amount of fines, a density of .631 and gave moldings without a mottle. Powder from the same batch when pilled without using water as a plasticizer gave granular material containing more than twice as much fines passing an 80 mesh screen.

It is to be understood that the claims herein cover all changes and modifications of the examples of the invention herein chosen for purposes of illustration which do not constitute departures from the spirit and scope of the invention.

I claim:

1. A method of preparing a granular thermosetting molding compostion comprising the steps of grinding to a powder a dried thermosetting aminoplast composition having proper flow for hot molding, mixing molding adjuvants into the powder to provide a uniformly blended composition, distributing water through the power and heating the powder by condensation of steam within the powdered mass, compressing the moistened material, and thereafter drying and breaking up the mass to produce a granular, rapid-cure and time-stable molding composition free from excessive gassing and having approximately twice the density as the powder from which it was produced, all of the above-mentioned steps being performed under conditions of temperature and time which do not substantially advance the cure of the composition.

2. A method of preparing a granular thermosetting molding composition comprising the steps of grinding to a powder a dried thermosetting aminoplast composition having proper flow for hot molding, mixing molding adjuvants into the powder to provide a uniformly blended composition, distributing water through the powder and heating the powder by condensation of steam within the powdered mass, compressing the moistened material without appreciable heating of the powdered mass, and thereafter drying and breaking up the mass to produce a granular, rapid-cure and time-stable molding composition free from excessive gassing and having approximately twice the density as the powder from which it was produced, all of the above-mentioned steps being performed under conditions of temperature and time which do not substantially advance the cure of the composition.

3. A method as defined in claim 1 wherein the total water distributed through the powder is raised to an amount between 5% and 25%, based on the weight of the dry powder and the temperature of the powder is raised to a point not exceeding about 50° C. by condensation of steam within the powdered mass.

4. A method as defined in claim 2 wherein the total water distributed through the powder is raised to an amount between 5% and 25%, based on the weight of the dry powder and the temperature of the powder is raised to a point not exceeding about 50° C. by condensation of steam within the powdered mass.

References Cited in the file of this patent

UNITED STATES PATENTS

| | | |
|---|---|---|
| 2,346,708 | Smidth | Apr. 18, 1944 |
| 2,461,089 | Smidth | Feb. 8, 1949 |
| 2,477,009 | Sandler | July 26, 1949 |
| 2,512,364 | Moxness | June 20, 1950 |
| 2,516,295 | Borton et al. | July 25, 1950 |